Nov. 10, 1953  F. W. COFFING  2,658,720
TENSIONING AND PULLING DEVICE
Filed Nov. 25, 1949
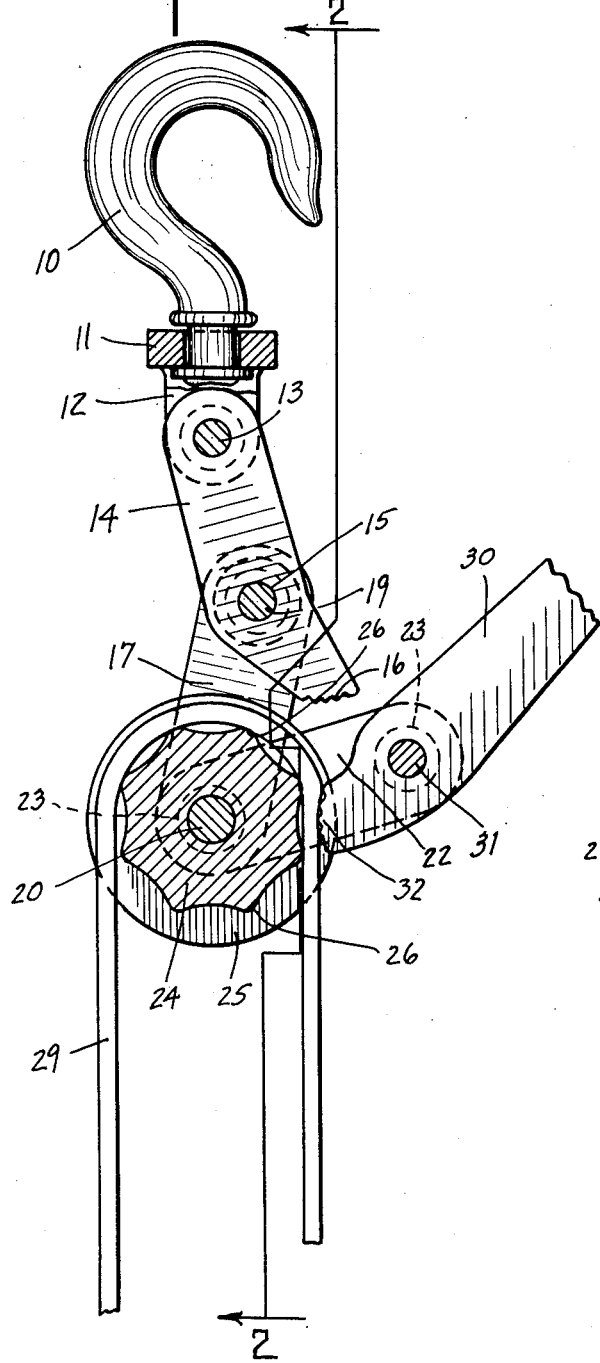
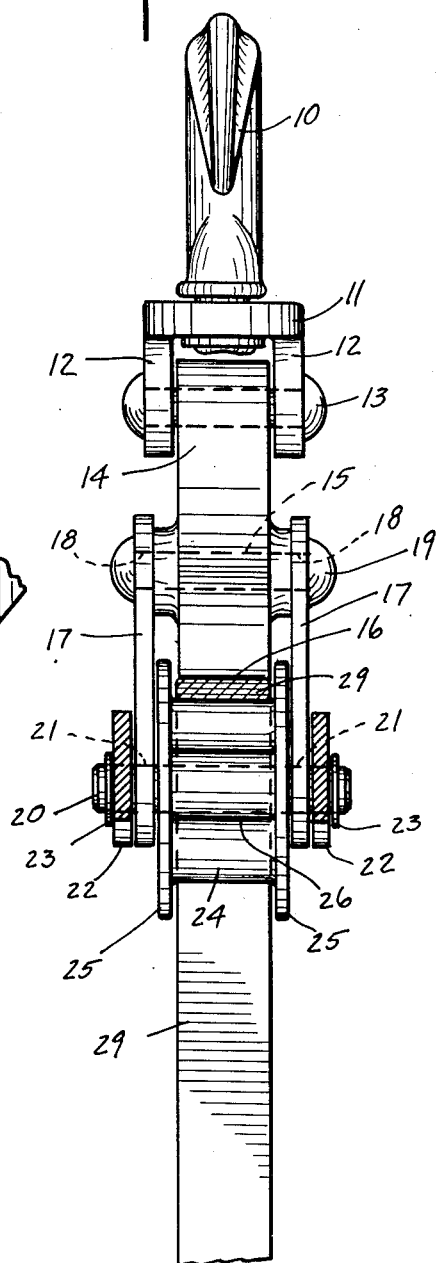
INVENTOR.
FREDRICK W. COFFING.
BY
Lockwood, Goldsmith & Galt,
ATTORNEYS.

Patented Nov. 10, 1953

2,658,720

UNITED STATES PATENT OFFICE 2,658,720

TENSIONING AND PULLING DEVICE

Fredrick W. Coffing, Danville, Ill., assignor to Coffing Hoist Company, Danville, Ill., a corporation Application November 25, 1949, Serial No. 129,248

1 Claim. (Cl. 254—167)

This invention relates to a tensioning device.

The object of the present invention is to provide a simple compact device that may be suitably anchored and have a flexible pulling media such as an elongated woven tape, rope, etc., passed therethrough and disposed upon a wheel, said wheel rotating therewith as the elongated means is worked through the device stroke by stroke through the medium of an oscillatory lever handle.

One feature of the present invention relates to the said wheel being of corrugated character and having associated therewith a pivoted load holding pawl and a lever operable load pulling pawl.

Another feature of the invention resides in the articulated character of the device.

A further feature of the invention resides in the simple compact form of the device.

Other objects and features of the invention will be set forth more fully hereinafter.

The full nature of the invention will be understood from the accompanying drawings and the following description and claim.

In the drawings Fig. 1 is a longitudinal central sectional view through one embodiment of the invention, the pawls and elongated flexible means being shown in side elevation as well as the anchoring hook, said means being shown in tape form.

Fig. 2 is an end elevation thereof taken substantially on line 2—2 of Fig. 1 and in the direction of the arrows.

In the drawings, 10 indicates a hook that is swiveled in the central portion 11 of a U-shaped member having parallel arms 12 mounting pivot rivet 13.

Pivotally supported thereon is one end of a member 14 apertured at 15 between the ends, the other end having a cooperating gripping portion 16. A pair of side links 17 are pivotally mounted at 18 upon pivot rivet 19 disposed in aperture 15.

An axle 20, see Fig. 2, is rotatably supported in aperture 21 in the links 17. Carried by the axle 20 outwardly of links 17 are the links 22. Retainers 23 are also provided. Rotatably mounted on the axle is the wheel 24 provided at opposite sides with flanges 25 or loose side disks or guides if desired.

The periphery of the wheel 24 is corrugated as shown at 26, see Fig. 1.

The flexible means herein as shown is of a woven fabric tape and the same has a generally rectangular section. It is designated herein by the numeral 29.

It will be recalled that links 22, see Fig. 1, are carried by the axle 20 and the links 22 at their outer ends straddle a handle 30 which is pivoted at 31 to said links and the inner end of the handle terminates in a tape gripping pawl or body 32 disposed immediately contiguous to the corrugated wheel 24.

The operation of this form of the device is as follows: With the parts as shown in Fig. 1, the handle 30 is tilted upon the pivot 31 so as to free the pawl 32 from the web 29 and at this time the load, since the web is under tension, as it were, is now held by the pawl 16 which is so disposed that it grips the web between portions thereof that are projected outwardly by virtue of the corrugations 26 on said wheel. In other words, it grips the web in the valley between corrugations. When the handle pawl has been thus freed, the handle is moved counterclockwise, see Fig. 1, to an upper position together with the links 22, and then the handle is tilted clockwise upon the pivot 31 so as to cause pawl 32 to grip the tape or web immediately contiguous to the pawl 16. Having thus gripped the tape and made the same rigid with the wheel and having seated the pawl 32 in the valley of the wheel, the handle movement is continued clockwise.

In this case the pawl 16 rides, as it were, over the humps of the wheel or more specifically the humps in the tape which are formed as a result of the wheel corrugations 26 when the tape is conformed thereto by virtue of the pressure exerted upon the run of the tape supported by the wheel. The load is carried by the hook 10. Pawl 16 is constrained, to tape engagement. Thus by pumping on the handle 30 in the manner described, the tape 29 can be taken up and whatever load is on the end of the tape will be moved toward the hook 10.

From the foregoing it will be observed that due to the linkage 14, 17 having a pivotal connection at 18 the wheel 24 will be caused to swing laterally in a direction away from the nose of the holding pawl when the handle 30 is pulled down to raise the load. Pulling down on the handle 30 will exert a force radially of the wheel in a direction away from the gripping portion 16 of the load pawl, thereby swinging the wheel about the pivotal connection at 18 tending to free the gripping action of the gripping portion 16 upon the belt. Thus, there will be no drag of the holding pawl upon the belt as the wheel is rotated in the load raising direction which will eliminate wear and tear thereon as well as lessen the energy necessary to lift the load.

The invention claimed is:

A pulling device comprising in combination a shaft, a corrugated wheel mounted on said shaft over which a flexible belt is adapted to ride for pulling a load, a pair of links pivotally connected to said shaft at opposite sides of said wheel, a holding pawl member pivotally mounted intermediate its ends between the free ends of said links having a holding nose at one end thereof engageable with said belt to force it into the corrugations of said wheel, supporting means carried by said member at the other end thereof, said holding pawl member being so disposed on its pivotal axis that the load pull will move its nose into wheel holding position, a second pair of lever carrying links pivotally mounted on said shaft beyond the sides of said wheel, and an operating lever pivotally supported by the free ends of said links having a belt engaging nose extending beyond its pivotal connection disposed to force said belt into the corrugations of said wheel in a direction to swing said wheel away from said holding nose.

FREDRICK W. COFFING.

References Cited in the file of this patent

UNITED STATES PATENTS

| Number | Name | Date |
|---|---|---|
| 59,874 | Tibbets | Nov. 20, 1866 |
| 328,023 | Glashan | Oct. 13, 1885 |
| 1,100,956 | Davies et al. | June 23, 1914 |